Sept. 24, 1929.  J. F. KREMA  1,729,221
TABLE
Filed June 16, 1926   2 Sheets-Sheet 1
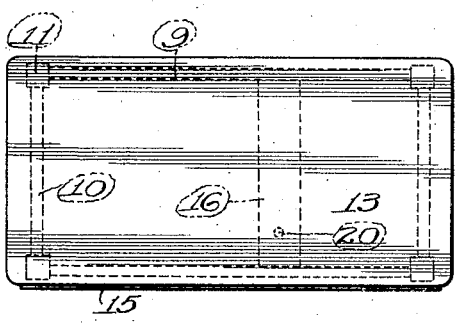
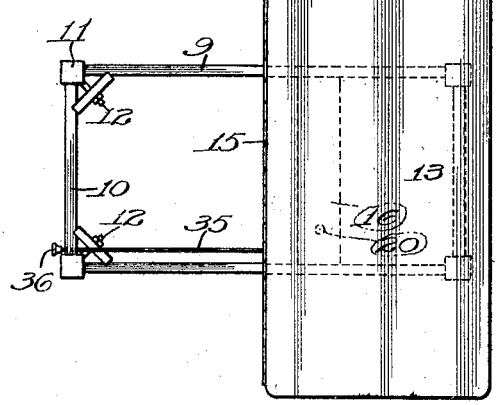
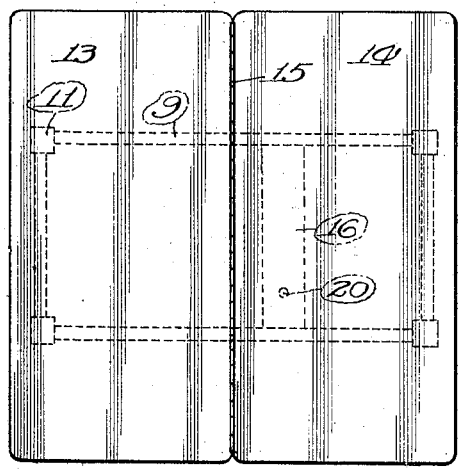
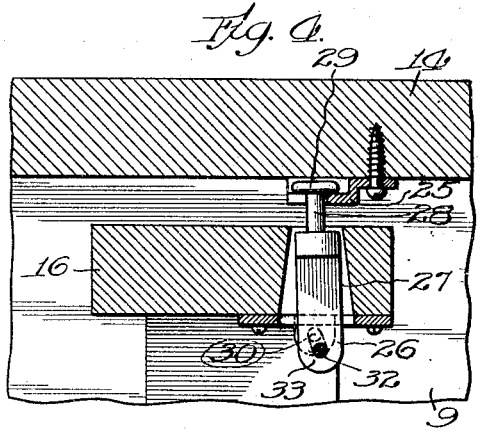
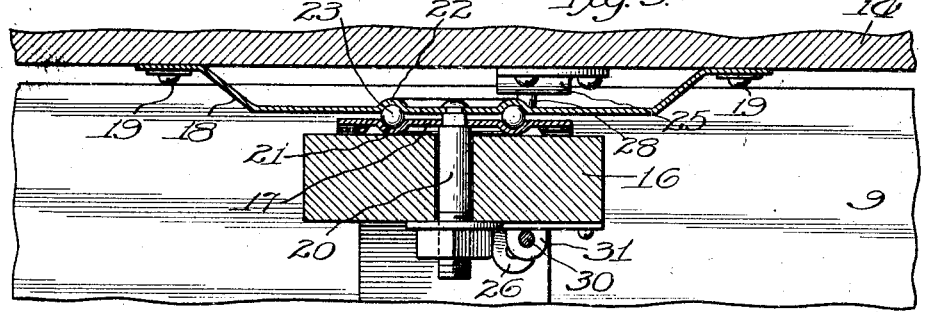

Sept. 24, 1929.   J. F. KREMA   1,729,221
TABLE
Filed June 16, 1926   2 Sheets-Sheet 2
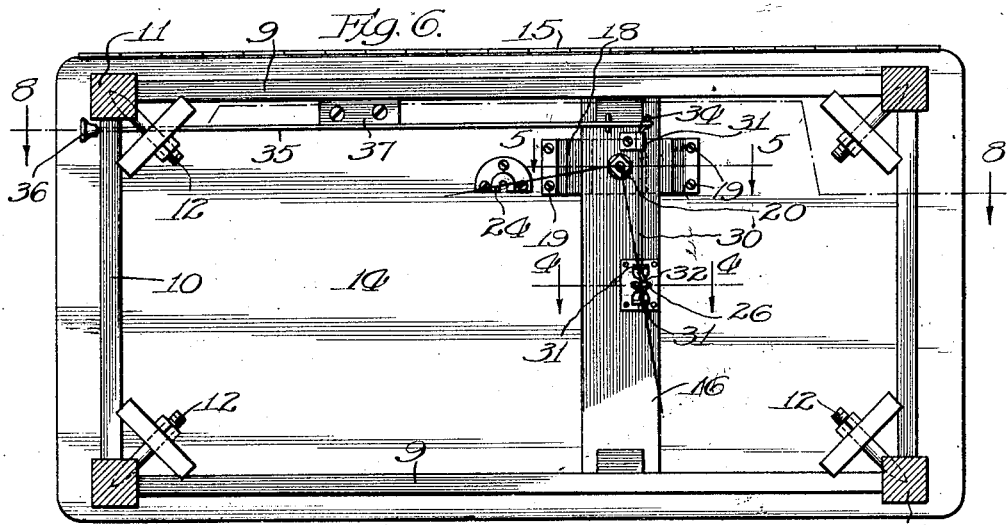
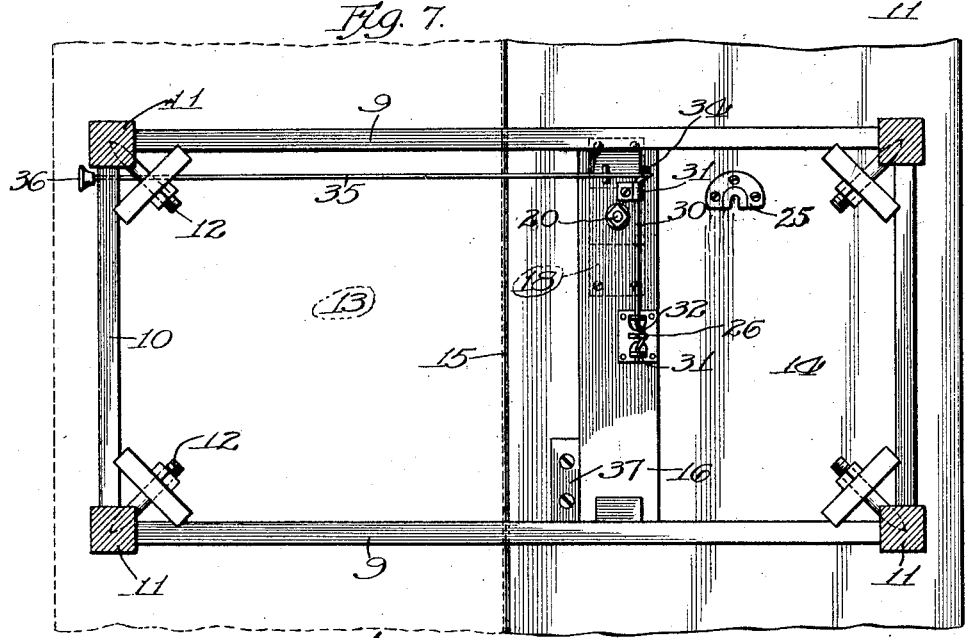
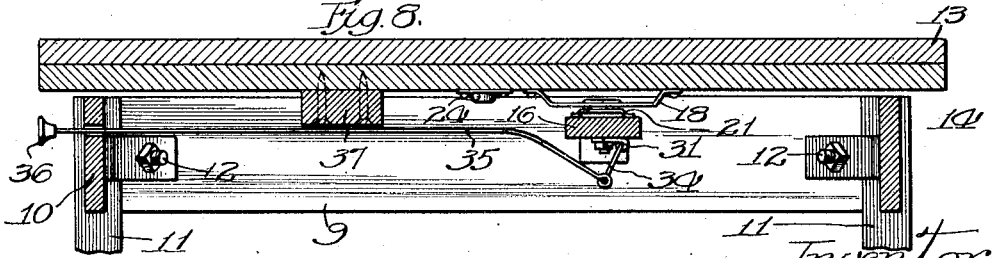

Patented Sept. 24, 1929

1,729,221

UNITED STATES PATENT OFFICE

JOHN F. KREMA, OF WILMETTE, ILLINOIS, ASSIGNOR TO THE DEARBORN COMPANY, OF CHICAGO, ILLINOIS, A CORPORATION OF ILLINOIS

TABLE

Application filed June 16, 1926. Serial No. 116,256.

This invention relates to tables and it is particularly adapted for household tables of that type which embody two hinged leaves pivotally mounted to swing relative to the frame and adapted to be used with the leaves closed one upon the other for certain purposes, such as for kitchen work, or to be used with the leaves open for other purposes as, for example, a dining table.

The object of the invention is to provide novel means of simple construction for pivoting the leaves upon the frame and for securing the leaves rigidly in closed or in open position.

Referring to the drawings illustrating a selected embodiment of the invention:

Fig. 1 is a top plan view showing the leaves in closed position.

Fig. 2 is a top plan view showing the folded leaves swung on the pivot to a position preliminary to opening the leaves.

Fig. 3 is a top plan view showing the leaves in open position.

Fig. 4 is a detail enlarged sectional view on the line 4, 4 of Fig. 6.

Fig. 5 is a detail enlarged sectional view on the line 5, 5 of Fig. 6.

Fig. 6 is a bottom view of the table with the leaves in closed position showing the legs in section.

Fig. 7 is a view similar to Fig. 6 with the leaves in open position.

Fig. 8 is a longitudinal sectional view on the line 8, 8 of Fig. 6.

Referring to the drawings the frame of the table comprises sides 9, 9, and ends 10, 10 which are connected together and to the legs 11 by suitable fastening means 12. The frame is oblong in shape, the sides being about twice as long as the ends, this being found to be a convenient shape and size of frame to support two leaves 13, 14 which are hinged at 15 along one edge,—preferably by a piano hinge. In closed position the leaf 13 is folded on the leaf 14 and the two leaves extend lengthwise of the frame as shown in Fig. 1. In open position the folded leaves are swung transversely of the frame as shown in Fig. 2 and the leaf 13 is swung to open position, the two leaves then extending transversely of the frame as shown in Fig. 3.

A cross piece 16 is secured to the sides 9, 9 of the frame adjacent the longitudinal middle of the frame. A bearing plate 17 is arranged on the cross piece 16 and a bearing plate 18 is secured by screws 19 to the underside of the leaf 14. The two bearing plates are also secured to the cross piece 16 by a bolt 20. The bearing plate 17 has a channel 21 and the bearing plate 18 has a corresponding channel 22 to form a race for the balls 23, the balls and bearing plates constituting a ball bearing between the leaves and the frame to enable the leaves to be swung easily and freely on the pivot bolt 20. The bearing plates 17 and 18 may be stamped from sheet metal and the pivot bolt 20 can be adjusted as required to make the ball bearing work easily or otherwise as may be desired.

I provide a device for locking the table with the leaves closed or open against accidental pivotal movement during use of the table. This device comprises two slotted keepers 24 and 25 fastened to the underside of the leaf 14. The keeper 24 is located in a direction from the pivot 20 extending lengthwise of the leaf and the keeper 25 is located in a direction from the pivot extending transversely of the leaf. A clamp 26 projects through an opening 27 in the cross piece 16 and it has a shank 28 adapted to enter the slots in the keepers, and a head 29 to engage the keepers. A rod 30 is mounted to rock in bearings 31 on the underside of the cross piece 16 and this rod is bent at 32 to form a crank which engages an opening 33 in the lower end of the clamp 26. The crank 32 in the rod 30 is located between two of the bearings 31 on opposite sides of the lower end of the clamp 26, and in the construction shown this crank 32 is adjacent one end of the rod. The other end of the rod is bent to form a crank arm 34 to which an operating rod 35 is attached. This operating rod projects through one end of the frame and carries a knob 36. A stop 37 is fastened on the underside of the leaf 14 adjacent its hinged edge to engage one side of the frame (Fig. 6) or to engage the cross piece 16 (Fig. 7) to limit the swinging movement of the leaves.

In practice the table is used with the leaves in folded position and extending lengthwise of the frame (Fig. 1) or the leaves are swung on the pivot bolt transversely of the frame (Fig. 2) and then the upper leaf 13 is swung to open position (Fig. 3). In open position of the leaves the surface area of the table top is twice that of the top when the leaves are folded and this makes the table convenient for use as a dining table or for other purposes. When the table is arranged with the leaves in closed position (Figs. 1, 6) the clamp is engaged with the keeper 25; when the table is arranged with the leaves in open position (Figs. 3, 7) the clamp is engaged with the keeper 24. The crank rod 30 may be made of wire rod and it has enough flexibility, and the parts are preferably so proportioned that when the clamp is engaged with a keeper and the rod 35 is operated the crank 32 may be forced to a position which will produce a tension on the clamp 26 to hold in firmly in engagement with the keeper. When the clamp is set in locked engagement with a keeper the table top, comprising the two leaves, will be held rigidly in fixed position against accidental pivotal movement. The stop 37 engages the side of the frame or the cross piece to prevent pivotal movement of the table top in one direction and the clamp engaging the keeper 24 or the keeper 25 prevents pivotal movement of the table top in the other direction. Thus the table top is held rigidly in desired position against accidental pivotal movement which may easily happen, if no preventive means are employed, when persons are passing around the corners of the table, and if it does happen dishes, vases or other articles on the table may be knocked over and damaged. I have described the table as if it were used with the leaves folded as a kitchen table and with the leaves open or unfolded as a dining room table, but it will be understood that this is only one use which may be made of it. The top of the leaf 13, when the leaf is folded upon the leaf 14 (Fig. 1) may have a wood finish so that the table can be used as a living room or dining table and the inner opposing faces of the leaves when they are folded may have a porcelain finish to adapt the table for use as a kitchen table when the leaves are opened (Fig. 3).

Changes in the form, construction and arrangement of the parts of my invention may be made without departing from the spirit and without sacrificing the advantages thereof and I reserve the right to make all such changes as fall within the scope of the following claims.

I claim:

1. A table comprising a frame, a cross piece on the frame, a leaf pivoted to said cross piece, another leaf hinged at one edge to said pivoted leaf, keepers on the underside of the pivoted leaf, a clamp arranged to engage one or the other of said keepers to secure the leaves in adjusted position, a crank rod supported on the cross piece and having a crank engaging the clamp, a crank arm on said rod, and an operating rod engaging said crank arm.

2. A table comprising a frame, a cross piece on the frame having an opening therein, a leaf pivoted to the cross piece, slotted keepers on the underside of the pivoted leaf, one of said keepers being located from the leaf pivot in a direction transversely of the leaf and having its slot directed longitudinally of the leaf, and the other keeper being located from said pivot in a direction longitudinally of the leaf and having its slot directed transversely of said leaf, a clamp projecting through said opening in the cross piece to engage either of said slotted keepers, and means for operating the clamp.

3. A table comprising a frame, a cross piece on the frame having an opening therein, a leaf pivoted to the cross piece, slotted keepers on the underside of the pivoted leaf, one of said kepers being located from the leaf pivot in a direction transversely of the leaf and having its slot directed longitudinally of the leaf, and the other keeper being located from said pivot in a direction longitudinally of the leaf and having its slot directed transversely of said leaf, a clamp projecting through said opening in the cross piece and having a shank and a head to engage either of said slotted keepers, said clamp having an opening therein, bearings on the cross piece, a rod supported at its ends in said bearings and having a crank between said bearings engaging said opening in the clamp, and means for operating said rod.

JOHN F. KREMA.